United States Patent
Vogt

(10) Patent No.: US 7,267,219 B2
(45) Date of Patent: Sep. 11, 2007

(54) BUTT-WELDABLE CONVEYOR BELT

(75) Inventor: Jürg Vogt, Lucerne (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 10/528,098

(22) PCT Filed: Sep. 11, 2003

(86) PCT No.: PCT/CH03/00614
§ 371 (c)(1),
(2), (4) Date: Mar. 16, 2005

(87) PCT Pub. No.: WO2004/026576
PCT Pub. Date: Apr. 1, 2004

(65) Prior Publication Data
US 2006/0163042 A1    Jul. 27, 2006

(30) Foreign Application Priority Data
Sep. 17, 2002   (CH) .................................. 1575/02

(51) Int. Cl.
*B65G 15/34*   (2006.01)

(52) U.S. Cl. ................... 198/847; 198/844.1; 198/846

(58) Field of Classification Search ............. 198/844.1, 198/846, 847
See application file for complete search history.

(56) References Cited

U.S. PATENT DOCUMENTS 3,616,164 A * 10/1971 Tanimoto et al. .......... 442/358

(Continued)

FOREIGN PATENT DOCUMENTS

EP           0 760 385 A1      3/1997

(Continued)

OTHER PUBLICATIONS

Saechtling, "Kunststoff Taschenbuch", 27th edition, chapter 3.2.7.2., pp. 17-19, Hanser Publishing, Munich, Germany.

*Primary Examiner*—Gene O. Crawford
*Assistant Examiner*—Leslie A. Nicholson, III
(74) *Attorney, Agent, or Firm*—Hodgson Russ LLP

(57) ABSTRACT

The invention relates to conveyor belts, which have a laminate consisting of: i) a textile ply (1) with a first ply surface (11) and with a second ply surface (12); ii) a first synthetic material ply (2), which adheres to the first ply surface (11), is made of a thermoplastic material having a creep resistance $v_k$ of no greater than 0.005 at 30° C., and which contains at least 70% by weight of a thermoplastic having a creep resistance $v_k$ of no greater than 0.005 at 30° C.; and iii) a second synthetic material ply (3), which adheres to the second ply surface (12), is made of a thermoplastic material having a creep resistance $v_k$ of no greater than 0.005 at 30° C., and which contains at least 70% by weight of a thermoplastic having a creep resistance $v_k$ of no greater than 0.005 at 30° C., with the provision that the quotient $r_v$ of formula (I):

$$r_v = \frac{V_B \rho_T}{G_T} - 1,$$

wherein $V_B$ represents the surface volume of the laminate, $\rho_T$ represents the density, and $G_T$ represents the weight per unit area of the textile ply (1), results in a value ranging from 5 to 25. These conveyor belts can be joined to form endless conveyor belts via butt end connections.

15 Claims, 2 Drawing Sheets

U.S. PATENT DOCUMENTS

| | | | |
|---|---|---|---|
| 4,109,543 A * | 8/1978 | Foti | 198/847 |
| 4,674,622 A | 6/1987 | Utsunomiya et al. | |
| 4,767,389 A | 8/1988 | Habegger et al. | |
| 5,164,241 A * | 11/1992 | Andre De La Porte et al. | 428/97 |
| 5,254,641 A * | 10/1993 | Alex et al. | 525/424 |
| 5,958,570 A | 9/1999 | Schwambach et al. | |
| 5,985,392 A | 11/1999 | Hert et al. | |
| 6,921,502 B1 * | 7/2005 | Nord et al. | 264/46.4 |
| 2002/0148707 A1 * | 10/2002 | Tarnawskyj et al. | 198/844.2 |
| 2003/0050573 A1 * | 3/2003 | Kuhr et al. | 600/567 |
| 2004/0168757 A1 * | 9/2004 | Vogt et al. | 156/137 |

FOREIGN PATENT DOCUMENTS

JP   07027178   1/1995

\* cited by examiner

BUTT-WELDABLE CONVEYOR BELT

BACKGROUND OF THE INVENTION

The present invention relates to the field of conveyor belts which are reinforced with a textile ply.

Known conveyor belts are principally divided into two groups: conveyor belts without textile reinforcement and conveyor belts that are reinforced at least with a piece of flat textile material.

Conveyor belts without textile reinforcement consist of a homogenous, relatively thick sheet of a thermoplastic plastic. This plastic must meet the required surface properties as well as also transmit the tractive forces acting in the belt. In a special version, a flat textile material is laminated on the running side of the belt. This helps with transmitting the tractive forces. Conveyor belts without textile reinforcement on the one hand have the advantage that they are able to be cleaned well thanks to the entirely pore free surface. Neither can lint or loose fibres lead to contamination. These advantages are however no longer applicable as soon as a flat textile material is applied on the running side. The method for implementing end-to-end joints is very simple and demands only a few technical tools. On the other hand they have the disadvantage that with increasing length of service they elongate and therefore have to be shortened again and again and joined end-to-end anew. This behaviour arises through the creeping of the thermoplastic under the constant tensile stress. Frequently an insufficient flatness of the belts is observed, in particular in the region of the end-to-end joint.

In the case of conveyor belts without textile reinforcement, to produce the end-to-end joint both ends are cut perpendicularly to the direction of travel, or at a slight angle from perpendicular, e.g. of 75°. The ends are abutted and coalesced together with heat and pressure or welded together with a filler filament of thermoplastic plastic.

Conveyor belts with reinforcement with a flat textile material comprise at least a fabric ply, which can be arranged on the running side, in the inside or on the conveying side of the conveyor belt. The ply or the plies of fabric also have the task to absorb the forces that the conveyor belt has to transmit. The reinforced fabric plies are coated on one side or both sides with thermoplastic plastic. These coatings cater for the required surface properties (friction factor, abrasion resistance) and produce a closed, easy to clean surface. Conveyor belts with textile reinforcements also have the advantage that despite the constant tensile stress that they are exposed to, they elongate only very slightly. They are characterised by a good flatness, also in the region of the end-to-end joint. It enables thin, and correspondingly flexible conveyor belts with high resistance to tearing, to be made. The fabric reinforcements on the conveying side or the running side have disadvantageous effects on the cleaning properties: the pores in the fabric which arise after some period of service, fill up with contaminants, which can only be removed with difficulty. In the area of foodstuffs conveyance this frequently forms a medium for undesired or dangerous microorganisms and fungi. If the belt is damaged by mechanical influences on the edge or on the backside, the reinforcement fabric layers begin to wear slightly or to fray. Fibres or fibre residues that have worked their way out of the bonded material may contaminate the conveyed good, and may compromise the function of the belt.

In order to make fabric reinforced conveyor belts endless, so called finger end-to-end joints are made: The two ends of the belt are cut out zigzag shaped, the zigzags pushed into each other, and the thermoplastic layers are welded by means of temperature and pressure. The points of the zigzags are thereby formed so that their flanks typically are at an angle, measured in the clockwise direction or anti-clockwise direction, of 170° to 175° to the middle line of the conveyor belt. It is generally assumed in the art that finger end-to-end joints are required in fabric reinforced conveyor belts. Firstly the tensile load decreases per unit length of the end-to-end joint, since the zigzags with their steep flanks increase the effective total length of the end-to-end joint. They should secondly lead to interlocking of the threads of the flat woven textile material and thereby bring about only a small decrease of the tensile strength at the end-to-end joint. (See e.g. EP-A-0 240 861, page 4, lines 31-33). Thirdly making the end-to-end joint as a finger end-to-end joint impedes the fulling or milling parallel to the end-to-end joint when the belt bends around rollers, and transforms it into a fulling or milling nearly perpendicular to the flanks of the zigzags of the end-to-end joint, which slows down the material fatigue in the end-to-end joint. According to the knowledge of the applicant, all manufacturers of fabric reinforced conveyor belts, process belts or transport belts still today use the finger end-to-end joint method to produce the end-to-end joint. The method of the finger end-to-end joint requires however relatively elaborate and expensive tools.

The object of the present invention is to develop a conveyor belt, which can be made endless by simple means. The conveyor belt should not elongate in operation, so that it neither has to be retightened nor shortened, and it should lie flat when tightened or untightened, having no corrugations or warping.

SUMMARY OF THE INVENTION

The object is achieved according to the invention by a conveyor belt, comprising a layered composite of:
i) a textile ply with a first ply surface and a second ply surface;
ii) a first plastic layer, which adheres to the first ply surface, of a thermoplastic plastic with a creeping strength $v_k$ of at the most 0.005 at 30° C., which contains at least 70 percent by weight of a thermoplastic with a creeping strength $v_k$ of at the most 0.005 at 30° C.; and
iii) a second plastic layer, which adheres to the second ply surface, of a thermoplastic plastic with a creeping strength $v_k$ of at the most 0.005 at 30° C., which contains at least 70 percent by weight of a thermoplastic with a creeping strength $v_k$ of at the most 0.005 at 30° C.;

with the proviso that the quotient $r_v$ gives a value in the range of 5 to 25, according to the following Formula (I):

$$r_v = \frac{V_B \rho_T}{G_T} - 1, \qquad (I)$$

wherein $V_B$ denotes the volume per unit area of the said layered composite and $\rho_T$ denotes the density of the textile ply, and $G_T$ denotes the weight per unit area of the textile ply.

Departing from the current doctrine it was surprisingly found that conveyor belts, which are reinforced with a textile ply, can be made endless by means of butt end-to-end joints if the conveyor belt comprises the textile reinforcement in the form of a layered composite as defined above.

The thermoplastic plastics of the two plastic layers, which embed the textile ply like a sandwich, according to the invention should each have a creeping strength $v_k$ at 30° C. of at the most 0.005 (measured in units of 1/log(min/min), thus dimensionless). The creeping strength $v_k$ is thereby defined through Formula (II):

$$v_k = (\epsilon_1 - \epsilon_0)/(\log(100 \text{ min}) - \log t_0) \quad \text{(II)}$$

The creeping strength $v_k$ of the thermoplastic plastics or the thermoplastics contained within is determined in a TA Instruments Dynamic Mechanical Analyzer 2980 (TA Instruments, New Castle, Del., USA). Thereby a sample body of the respective plastic of length 255 mm and rectangular cross sectional area (6.0×2.0 mm) is thermostated in the sample chamber of the analyser to 30±0.1° C., at this temperature the gradual increase of the length of the sample body under a tensile stress of 1.20 MPa (corresponding to 1.2 N per mm² cross sectional area) is measured for 100 min and plotted as a graph of expansion $\epsilon$ of the sample body against log of time. The expansion $\epsilon$ is the increase in length of the expanded sample body as a percent of the length of the sample body before the tensile stress. The creeping strength $v_k$ according to the above formula is measured as slope from the semi-linear region of the graph: $t_0$ is the time point of the beginning of the semi-linear region of the graph, $\epsilon_0$ is the expansion of the sample body at time point $t_0$ and $\epsilon_1$ is the expansion of the sample body after 100 min.

Preferably the thermoplastic plastics of the two thermoplastic plastic layers have at 30° C. a creeping strength $v_k$ of at the most 0.004, and especially preferably of at the most 0.003.

The two thermoplastic plastic layers of the layered composite can, in regards to their material composition and/or their thickness, be the same or different from each other. Preferably however the melting point of the two plastic layers is in the range of about 80° C. to 170° C., and more preferably in the range of about 90° C. to 120° C.

Preferred examples for the plastics of the two plastic layers are plastics which contain at least 95 percent by weight of a thermoplastic with the creeping strength specified above. Such thermoplastics which are able to be utilised according to the invention are already known in the field of conveyor belts without textile reinforcement. Examples are TPE-A such as PEBA (polyether blockamides, here in particular poly(poly{tetramethylene ethylene glycol}-b-poly{ω-laurinlactam}), poly(poly{tetramethylene ethylene glycol}-b-poly{ε-caprolactam}), poly(polyethylene oxide-b-poly{ω-laurinlactam}) and poly(polyethylene oxide-b-poly{ε-caprolactam}); TPE-E such as poly(poly{tetradecakis[oxytetramethylene]oxyterephthaloyl}-b-poly{oxytetramethylene oxyterephthaloyl}); and TPE-U, here in particular co-polymers of polyesterdiols and diisocyanates, in which the polyesterdiol can be formed out of adipic acid and butanediol and the diisocyanate can be diphenylmethane-4,4'-diisocyanate.

A preferred example according to the invention of a thermoplastic for the plastic layers 2 and 3 are the likewise previously known thermoplastic ethylene-α-olefin-copolymers with ratio of weight average molecular weight $M_w$ to number average molecular weight $M_n$ of 5.0:1 to 1.5:1 and the mixtures of two or more of these polymers (for the definition of the terms weight average molecular weight and number average molecular weight see for example Saechtling "Kunststofftaschenbuch" 27th edition, Carl Hanser Verlag Munich, page 17 onwards). These values for weight average molecular weight and number average molecular weight for these copolymers can in particular be achieved, if the copolymer is produced by means of a so called "single-site" catalyst. The "single site" catalyst is a catalyst customarily used since about 11 years in the field of polyolefins, which consists of a mixture of a metallocene of a metal of the group IVa of the transition elements (e.g. bis(cyclopentadienyl)dimethylzirconium, however also metallocenes with only a cyclopentadienyl ligand and optionally further ligands) and a co-catalyst, in which the function of the co-catalyst is to convert the metallocene catalyst during the polymerisation reaction to the single positive charged state. The co-catalyst thereby forms a counter anion, which is not nucleophilic and is not coordinated on the metallocene. An example of the co-catalyst is e.g. polymeric methyl aluminoxane [MAO, —(Me—Al—O)$_n$—], that is used in such an amount that an Al:metallocene-molar ratio of about 100:1 to about 10 000:1 results. A further example of the co-catalyst are boranes with electronegative substituents, such as, for example, polyfluorinated aromatic hydrocarbons.

Especially preferably the two plastic layers of the layered composite each consist to at least 95 percent by weight of an ethylene-α-olefin copolymer with the above mentioned ranges for the ratio of weight average molecular weight to number average molecular weight, wherein the α-olefin comprises 3 to 12 carbon atoms, preferably 5 to 10 carbon atoms, especially preferably 8 carbon atoms. Examples for such α-olefins are 1-propene, 1-butene, 1-pentene, 1-hexene and 1-octene; the most preferred being 1-octene.

The creep resisting thermoplastics are non-crosslinked plastics, thus not elastomers.

Further components in the two plastic layers of the layered composite, beside the creep resisting thermoplastic, can other be thermoplastics such as EVA, EEA, EBA and EMA, and PP, if they are compatible with the creep resisting thermoplastics and do not compromise the creeping strength of the two layers. Further components in the two plastic layers can also be inert pigments, flame retardants, plasticizers, anti-bacterial means and the like. The anti-bacterial means can for example be compounds, which contain $Mg^{2+}$, $Ca^{2+}$, $Zn^{2+}$, $Ag^{2+}$, $Cu^{2+}$ or $Al^{3+}$. In particular these can be inorganic compounds, for instance the oxide or hydroxide of these cations. Examples for anti-bacterial means are also zinc pyrithion and imidazole. Mixtures out of two or more of the anti-bacterial means can also be used.

The quotient $r_v$ is originally the ratio of the sum of the volumes per unit area of the two plastic layers 2 and 3 to the volume per unit area of the textile ply. In the Formula (I) for the quotient $r_v$, $V_B$ denotes the volume per unit area of the layered composite in the conveyor belt according to the invention. In the simplest case $V_B$ can be measured directly as total thickness of the layered composite (volume/area=thickness). This is then the case, if the layered composite has a negligible amount of air pockets on the interface between one of the plastic layers 2 or 3 and the textile ply (e.g. 2 vol % or less). Good separation resistances between the layers, are an indication of such a low fraction of air pockets. $V_B$ can also be derived of course from the sum of the volumes per unit area of the plastic layers 2 and 3 and the volume per unit area of the textile ply. The $\rho_T$ in Formula (I) denotes the density (in kg/m³) of the textile ply contained in the layered composite and GT the weight per unit area (in kg/m²) of the textile ply contained in the layered composite. "Density $\rho_T$" of the textile ply is to be understood as the average density of the material out of which the threads or fibres of the textile ply consist.

In those cases where the conveyor belt according to the invention consists solely of the layered composite, $V_B$ can be specified directly as the volume per unit area of the conveyor belt itself. If the conveyor belt has additional layers and/or top coatings (see below), these can be ground or polished away before the determination of $V_B$.

The values for $\rho_T$ and $G_T$ can be determined before the assembly of the textile ply in the conveyor belt or from a sample of the textile ply taken from the conveyor belt. The removal can take place by mechanically separating the remaining plies and/or layers from the textile ply, if desired with heating; in case the individual layers in the conveyor belt according to the invention are not separable (see below) the textile ply can be isolated by mechanical removal of the remaining layers or by their dissolution in a suitable solvent, with subsequent cleaning of the textile ply of residues of the thermoplastic plastic by washing with a suitable solvent such as DMF and drying.

In a special case of the conveyor belt according to the invention, the layered composite can comprise two layers of thermoplastic plastics with the same density, wherein the thickness of the two layers can be the same or different. An example of such a special case are the preferred conveyor belts according to the invention with a symmetrical layer construction around the textile ply, so that both the density of the plastic and the thickness of the two layers are the same as one other (see below). For the above special case the quotient $r_\nu$ can also be given as follows $$r_\nu = \frac{G_B - V_B \rho_T}{V_B \rho_K - G_B} \quad (III)$$

wherein $V_B$ and $\rho_T$ have the same meaning as in Formula (I), $G_B$ denotes the weight per unit area (in kg/m$^2$) of the total layered composite of the conveyor belt and $\rho_K$ is the density of the two thermoplastic plastics.

For the purposes of the Formulas (I) and (III), the densities, weights per unit area and volumes per unit area can be measured, in those cases where these parameters do not appreciably depend on the temperature, at about room temperature to about 30° C. Otherwise the measurement is carried out at 30° C.

In the conveyor belts according to the invention $r_\nu$ is about 5.0 to about 25.0, preferably about 10.0 to about 20.0, and especially preferred about 12.0 to about 15.0. In contrast, in previously known conveyor belts with reinforced textile plies, which must be welded together by means of finger end-to-end joints, for all layered composites present therein thermoplastic/textile ply/thermoplastic values for $r_\nu$ of merely about 1.5 to about 4.0 are obtained.

The type of the textile ply present in the layered composite according to the invention is not critical, preferably according to the invention it is however a non-woven textile ply (i.e. not constructed of warp threads and weft threads).

The application of the two plastic layers on the textile ply can take place in an analogous manner to the respective method in the case of conveyor belts with woven textile reinforcement, for example by extrusion coating, lamination or calendering. For suitable coating methods reference is made by way of example to Saechtling, "Kunststofftaschenbuch" 27$^{th}$ edition, chapter 3.2.7.2.

The conveyor belts according to the invention can comprise, besides the layered composite already discussed, still further plies and/or layers, which can be applied on one or both plastic layers of the layered composite. Such additional layers can be further fabric plies, which are then preferably employed at the same time with a further creep resisting plastic layer as discussed above, and in such a way, that alternatively a textile ply and a plastic layer lie on top of each other. Further layers in the conveyor belt according to the invention can be static friction-reinforcing coatings, which are applied to the layer of the two plastic layers which forms the conveying side of the conveyor belt. The conveyor belt according to the invention can receive a surface modifying top coating on that plastic layer of the layered composite which should form the conveying side, e.g. to increase the solvent or chemical stability, or to decrease the adhesiveness. To increase the chemical stability, the additional top coating can be e.g. Teflon or poly(vinylidene difluoride). To increase the solvent resistance, a top coating of a duroplast can be provided, which is cross-linked after the application. In all further plastic layers, and the top coating, anti-bacterial means of the above-named type can likewise be used.

All these further plies and/or layers can be produced in an analogous manner to the production of corresponding layers in the previously known conveyor belts.

Preferred according to the invention are conveyor belts which have a symmetrical layer construction around the textile ply. This means firstly that the layered composite comprises two plastic layers, which are identical in regards to composition and thickness. Furthermore, further possible plies and/or layers are likewise always present pairwise, and in the opposing same order on the two sides of the layered composite.

With regard to a useable flexibility, the conveyor belts according to the invention can have a total thickness of preferably about 1.5 to about 5 mm, more preferably of about 2 to about 4 mm. Preferred embodiments of the conveyor belts according to the invention are those with a width of about 50 mm to about 5000 mm.

The joining of an endless conveyor belt can be carried out by means of welding the conveyor belt according to the invention which is provided with butt ends, as is customary in the field of conveyor belts without reinforcement textile plies, wherein a butt end-to-end joint is achieved. The term "butt" end-to-end joint has the same meaning in the context of the present application as in the field of conveyor belts without reinforcement textile plies. It designates a join, that binds two ends with each other of a conveyor belt which is initially not endless, whereby the conveyor belt becomes endless. The two ends are thereby cut in an essentially straight line in such a way that the ends can be appropriately joined together to each other, and after the joining together, amount to an essentially straight cut through the conveyor belt, which typically runs at an angle from about 90° to about 45°, preferably about 85° to about 65°, especially preferably about 75° to lengthwise of the conveyor belt, wherein the measurement of this angle can be made in the clockwise or in the anticlockwise direction (FIG. 2). It is not important whether layer 2 or layer 3 of the conveyor belt is considered in this measurement, therefore in FIG. 2 the reference numerals of both layers 2 and 3 were given. The above definition of "butt" in the context of the present application is also applicable to the "butt" ends before their joining to become the endless conveyor belt.

The preparation of the conveyor belt which is not yet endless, takes place before the production of the butt end-to-end joint, in which conveniently the conveyor belt is tailored to the desired length, and at the same time the butt ends are introduced. The thermoplastic properties of the two plastic layers of the layered composite are exploited during welding. The welding together takes place typically under a pressure of about 0.5 to about 3 bar. The welding together can be carried out as for example with the use of a hot press, as disclosed in German utility patent No. 83 32 647. On the other hand, the end-to-end joint can also be carried out at normal pressure by welding together with use of a filler filament. The endless conveyor belt, as well as the method for joining the two butt ends, are further objects of the present invention.

The conveyor belts according to the invention are characterised by a low amount of elongation in operation and therefore do not periodically have to be shortened and newly joined end-to-end. In the cross direction they remain flat and tend not to warp like conveyor belts which are not reinforced with a textile ply. The conveyor belts according to the invention also tend not to fray at the edges, so that a contamination of the goods to be conveyed with fibre remains and lint can be averted. The susceptibility to deposited dirt or bacteria is lowered with the conveyor belts according to the invention, so that they satisfy the highest hygienic standards.

Conveyor belts according to the invention can be regranulated and be recycled as raw material. The recyclability concerns both production waste, as well as belts which have a completed life cycle. To recycle the conveyor belts they are cleaned, reduced to small pieces according to current methods, and converted into granulate form. The granulate can be melted and used for the production of new products. Due to the large $r_v$ in the belts according to the invention, a removal of the relatively low quantity of residue of the textile ply out of this recycled material is often unnecessary.

BRIEF DESCRIPTION OF THE DRAWINGS

In the following an embodiment of the invention is described in more detail with reference to the accompanying figures, in which.

DETAILED DESCRIPTION OF THE INVENTION

Figure 1:
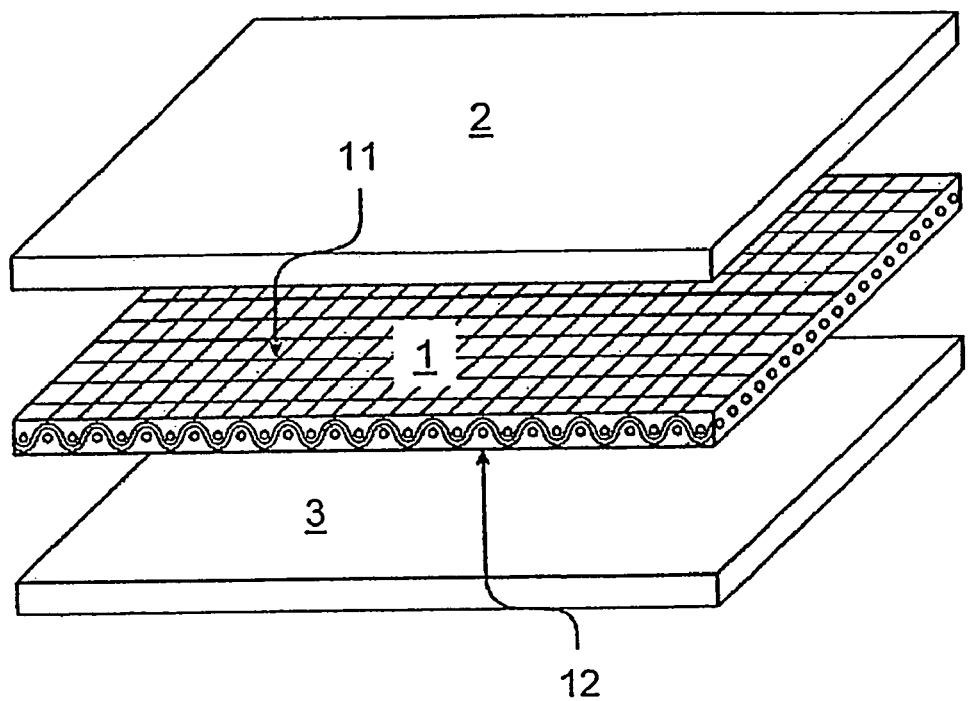
FIGS. 1 and 3—show exploded views of the layered composite in two conveyor belts according to the invention, FIG. 2—shows the orientation of the cut edges of two butt ends after the pushing together of the ends of the conveyor belt which is not yet endless. A cut edge is shown which is at an angle of about 60° in the anticlockwise direction to the running direction of the conveyor belt (solid line), wherein the running direction is symbolized with the arrow; and a cut edge which is at an angle of about 60° in the clockwise direction to the running direction of the conveyor belt (dashed).
Figure 2:
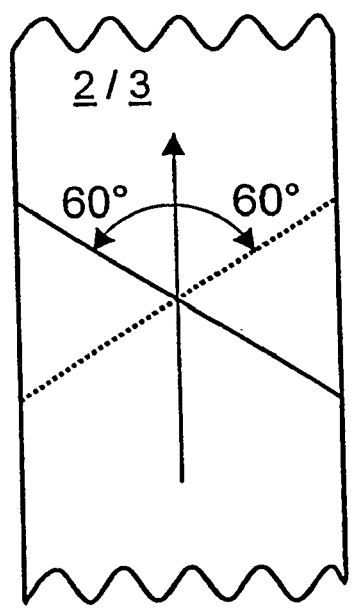

In FIG. 1 the construction of the layered composite of a conveyor belt according to the invention is shown. A textile is present, for example woven or non-woven (e.g. knitted, textured or fleece type) textile ply 1, on which the two plastic layers 2 and 3 are applied. The separation resistance, which the two plastic layers 2 and 3 of the layered composite show when the separation of them from the textile ply 1 is attempted, is preferably in each case at least 2.5 N/mm, wherein the measurement of this separation resistance takes place according to the standard DIN 53530, which hereby is included by reference in its entirety. More preferably the separation resistance is so high that the plastic layers 2 and 3 during a separation trial, rip internally rather than detach themselves from the textile ply 1; the layered composite is then considered as non-separable. The achieved separation resistance between the layers 2 and 3 and the textile ply 1 is a function of the material in all layers (materials compatible with each other give a higher separation resistance), as well as of the process temperature, and of the process pressure. By increasing the pressure and temperature a better flowing into of the plastics of the layers 2 and 3 in the textile ply 1 is achieved, and not only an incorporation of the threads of the textile ply 1 in the layers 2 or 3 may occur, but also a direct welding of the layers 2 and 3 within the ply 1 can be achieved.

The thickness of the plastic layers 2 and 3 is not critical and can be preferably in the range of about 0.5 mm to about 3 mm, wherein allowance can be made for the tensile strength of the conveyor belt which is to be achieved at the end-to-end joint (there the tensile strength of the conveyor belt is essentially only effected by the creeping resistant thermoplastic plastic of the layers 2 and 3) and allowance can be made for the demands on the flexibility of the conveyor belt. The thickness of the layers 2 and 3 can however be adjusted to each other in such a way as to allow for their thermal expansion behaviour. In view of the avoidance of corrugation of the conveyor belt by different expansion of the two layers 2 and 3 upon heating up in operation, is it preferred if both layers 2 and 3 have as much as possible the same thermal expansion behaviour.

Figure 3:
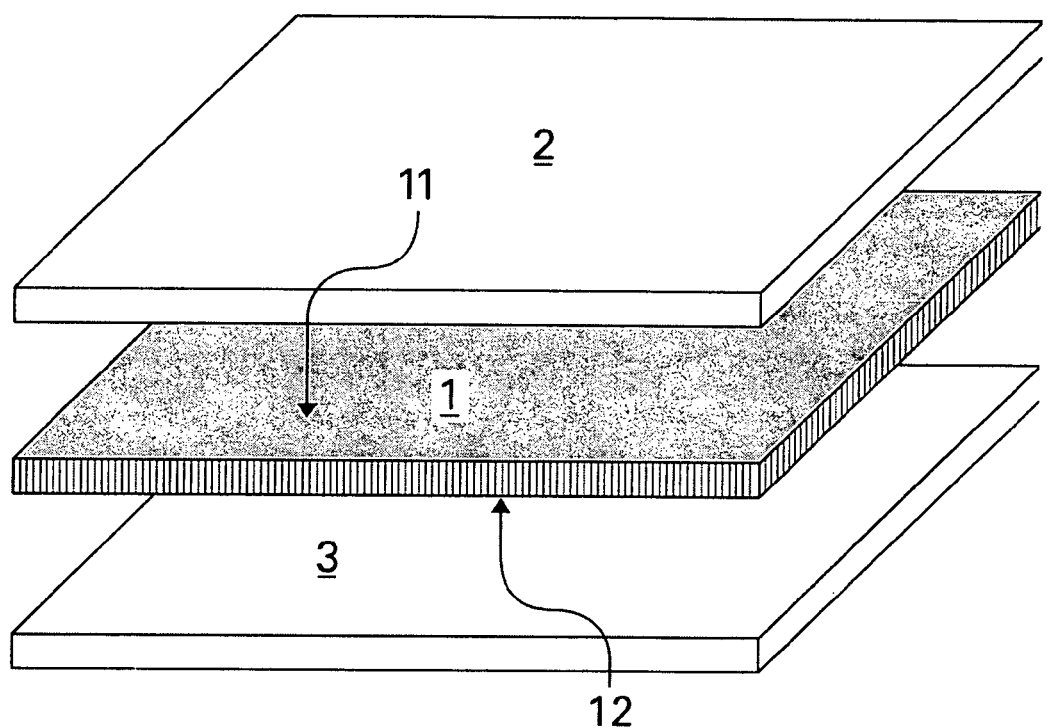

The non-woven textile ply 1 shown in FIG. 3 can, for example be made out of mesh, wherein all types of mesh patterns can be used. Non-woven textile plies 1 utilizable according to the invention are preferably characterized in that no threads of greater than 4 cm length can be pulled out from them, i.e. that they do not fray. The threads of the textile ply 1 can be monofilaments or multifilaments and preferably consist of a material such as polyamide (polyamide 6, polyamide 66, aramide) polypropylene, polyester, glass fibers, plastic bound carbon fibers, aluminum, steel or natural fibers such as cotton or ramie fibers. The thickness of the textile ply 1, as well as the monofilaments or multifilaments used therein is not critical, and therefore here, consideration can be primarily taken of the tractive forces acting on the conveyor belt, as well as of the desired total thickness of the conveyor belt, in regards to all further layers.

It is not critical, in the finished endless conveyor belt, which of the layers 2 or 3 forms the outer layer and with its surface forms the upper side of the conveyor belt (thus that side, which comes into contact with the goods to be conveyed, if no further coating is applied).

The surface of the uppermost layer of the conveyor belt according to the invention, be it the surface of one of the layers 2 or 3, or the surface of one of the additional top coatings applied on these layers, can also be processed mechanically, in order to apply a structured surface, thus for instance a defined profile, possibly adapted to the goods to be conveyed.

EXAMPLE 1

A conveyor belt with a symmetrical layer construction around the textile ply 1 was produced with the following features:

textile ply 1: knitted fabric of a polyester yarn with the following properties: density $\rho_T$ of the yarn material 1.35 g/cm³, tensile strength in warp direction 42 N/mm, elongation at rupture in warp direction 15.8%, weight per unit area $G_T$ of 0.250 kg/m², thickness 0.64 mm, force at 1% expansion 2.4 N/mm layers 2 and 3: thermoplastic copolymer of ethylene and 1-octene, which was synthesised with the aid of metallocene catalysts (Type Exact 0203, Manufacturer DEX-Plastomers). This copolymer has at 30° C. a creeping strength $v_k$ of 0.00293. The polymer was dyed white by means of a colour master batch, so that the proportion of the white pigment (titan dioxide) was 2.5% with regard to the total mixture. The finished thermoplastic plastic had a density $\rho_K$ of about 0.908 g/cm$^3$.

The production took place by means of extrusion coating with a single screw extruder (manufacturer Maillefer), which was equipped with a barrier screw and with a slot nozzle of width 450 mm. The casing temperature of the extruder was 180° C., the temperature of the slot nozzle was 160° C. The temperature of the two smoothing rolls was 60° C.

The conveyor belt consisting solely of a layered composite according to the invention had a total thickness of 2.80 mm (=volume per unit area $V_B$), a weight per unit area $G_B$ of 2.624 kg/m$^2$ and a quotient $r_v$, calculated according to Formula (III), of 14.1.

The belt was butt end-to-end joined at 120° C. with the known techniques, wherein the join patch had an angle of 75° to the direction of travel of the belt.

The conveyor belt had the following mechanical properties:

Force at 1% expansion: 6.5 N/mm
Tensile strength near to end-to-end joint: 62.7 N/mm
Tensile strength across end-to-end joint: 25.2 N/mm
Elongation at rupture near end-to-end joint: 16.8%
Elongation at rupture across end-to-end joint: 20.7%
Separation force of the layers: not separable, layers rip All measurements were determined lengthwise at 23° C. and a relative air humidity of 50%.

After 3.5 million alternate bends around a deflector roll with a diameter of 40 mm with a belt speed of 10 m/min and a belt tension of 3.8 N/mm, the belt had no rips or other damage.

The belt is authorised according to FDA 21 CFR 177.1520 "Olefin Polymers" para. (c) 3.1 b up to a temperature of 100° C. for contact with all types of foodstuffs.

EXAMPLE 2

The construction of the conveyor belt was comparable with that in Example 1. The same knitted fabric of polyester yarn was again used. The layers 2 and 3 consisted of a polyether blockamide, poly(poly{tetramethylene ethylene glycol}b-poly{ω-laurinlactam}) (Type Pebax 5533 SA01, Manufacturer Atofina). This copolymer has a creeping strength $v_k$ of 0.00043 at 30° C. The polymer was not dyed, its density $\rho_k$ measured according to ISO R 1183 was 1.01 g/cm$^3$. The production took place by means of extrusion coating with a single screw extruder (manufacturer Maillefer), which was equipped with a barrier screw and a slot nozzle of width 450 mm. The casing temperature of the extruder was 180° C., the temperature of the slot nozzle was 170° C. The temperature of the two smoothing rolls was 90° C. The conveyor belt consisting solely of a layered composite according to the invention had a total thickness of 3.0 mm (=volume per unit area $V_B$), a weight per unit area $G_B$ of 3.09 kg/m$^2$ and a quotient $r_v$, calculated according to Formula (III), of 15.2. The belt was butt end-to-end joined with known techniques at 180° C., wherein the join patch had an angle of 75° to the direction of travel of the belt.

EXAMPLE 3

The construction of the conveyor belt was comparable with that in Example 1. The same knitted fabric of polyester yarn was again used. The layers 2 and 3 consisted of a TPE-U, which is a copolymer of a polyesterdiol and of a diisocyanate (type Estane 58277, manufacturer Noveon). This copolymer has a creeping strength $v_k$ of 0.0040 at 30° C. The polymer was not dyed, its density $\rho_k$ measured according to DIN 53479 was 1.19 g/cm$^3$. The production took place by means of extrusion coating with a single screw extruder (manufacturer Maillefer), which was equipped with a barrier screw and a slot nozzle of width 450 mm. The casing temperature of the extruder was 190° C., the temperature of the slot nozzle was 190° C. The temperature of the two smoothing rolls was 40° C. The conveyor belt consisting solely of a layered composite according to the invention had a total thickness of 4.0 mm (=volume per unit area $V_B$), a weight per unit area $G_B$ of 4.79 kg/m$^2$ and a quotient $r_v$, calculated according to Formula (III), of 20.4. The belt was butt end-to-end joined with known techniques at 170° C., wherein the join patch had an angle of 75° to the direction of travel of the belt. The belt is authorised according to FDA 21 CFR 177.2600 without temperature restriction for contact with all types of foodstuffs.

The invention claimed is:

1. Conveyor belt comprising a layered composite of:
    i) a textile ply (1) with a first ply surface (11) and a second ply surface (12);
    ii) a first plastic layer (2), which adheres to the first ply surface (11), of a thermoplastic plastic with a creeping strength $v_k$ of at the most 0.005 at 30° C., which contains at least 70 percent by weight of a non-crosslinked thermoplastic with a creeping strength $v_k$ of at the most 0.005 at 30° C.; and
    iii) a second plastic layer (3), which adheres to the second ply surface (12), of a thermoplastic plastic with a creeping strength $v_k$ of at the most 0.005 at 30° C., which contains at least 70 percent by weight of a non-crosslinked thermoplastic with a creeping strength $v_k$ of at the most 0.005 at 30° C.; with the proviso that the quotient $r_v$ gives a value in the range of 5 to 25 according to the following Formula (I):

$$r_V = \frac{V_B \rho_T}{G_T} - 1, \tag{I}$$

wherein $V_B$ denotes the volume per unit area of the said layered composite and $\rho_T$ denotes the density of the textile ply (1), and $G_T$ denotes the weight per unit area of the textile ply (1).

2. Conveyor belt according to claim 1, characterised in that the thermoplastic plastics of the plastic layers (2) and (3) each contain at least 95 percent by weight of a thermoplastic with a creeping strength $v_k$ of at the most 0.005 at 30° C.

3. Conveyor belt according to claim 2, characterised in that the thermoplastics are selected from the group consisting of TPE-A, TPE-E, TPE-U, and the ethylene-α-olefin-copolymers with ratio of weight average molecular weight $M_w$ to number average molecular weight $M_n$ of 5.0:1 to 1.5:1.

4. Conveyor belt according to claim 3, characterised in that TPE-A is selected from the group consisting of poly(poly{tetramethylene ethylene glycol}-b-poly{ω-laurinlactam}), poly(poly{tetramethylene ethylene glycol}-b-poly{ε-caprolactam}), poly(polyethylene oxide-b-poly{ω-laurinlactam}) and poly(polyethylene oxide-b-poly {ε-caprolactam }), in that TPE-E is poly(poly{tetradecakis[oxytetramethylene]oxyterephthaloyl}-b-poly {oxytetramethylene oxyterephthaloyl}), or TPE-U is TPE-U produced from polyesterdiols and diisocyanates.

5. Conveyor belt according to claim 1, characterised in that the two layers (2) and (3) consist of the same thermoplastic plastic.

6. Conveyor belt according to claim 1, characterised in that the textile ply (1) is non-woven.

7. Conveyor belt according to claim 1, characterised in that the separation resistance between layer (2) and textile ply (1) and between layer (3) and textile ply (1) is in each case at least 2.5 N/mm, measured according to the standard DIN 53530.

8. Conveyor belt according to claim 1, comprising a top coating.

9. Conveyor belt according to claim 8, containing antibacterial means in the top coating.

10. Conveyor belt according to claim 1, containing antibacterial means in the layer (2) and/or the layer (3).

11. Conveyor belt according to claim 1, characterised in that it has a symmetrical layer construction around the textile ply (1).

12. Conveyor belt according to claim 1, with a width of 50 to 5000 mm.

13. Endless conveyor belt according to claim 1, comprising a butt end-to-end joint.

14. Conveyor belt according to claim 1, comprising two butt ends.

15. Method for making a conveyor belt endless, wherein the belt comprises a layered composite of:

i) a textile ply (1) with a first ply surface (11) and a second ply surface (12);

ii) a first plastic layer (2), which adheres to the first ply surface (11), of a thermoplastic plastic with a creeping strength $V_k$ of at the most 0.005 at 30° C., which contains at least 70 percent by weight of a non-crosslinked thermoplastic with a creeping strength $V_k$ of at the most 0.005 at 30° C.; and iii) a second plastic layer (3), which adheres to the second ply surface (12), of a thermoplastic plastic with a creeping strength $v_k$ of at the most 0.005 at 30° C., which contains at least 70 percent by weight of a non-crosslinked thermoplastic with a creeping strength $v_k$ of at the most 0.005 at 30° C.; with the proviso that the quotient $r_v$ gives a value in the range of 5 to 25 according to the following Formula (I):

$$r_v = \frac{V_B \rho_T}{G_T} - 1, \quad (I)$$

wherein $V_B$ denotes the volume per unit area of the said layered composite and $\rho_T$ denotes the density of the textile ply (1), and $G_T$ denotes the weight per unit area of the textile ply (1); wherein the method comprises:

i) providing the conveyor belt with butt ends, and ii) welding together of the butt ends.

* * * * *